March 11, 1958 R. L. JONES 2,826,448
VEHICLE WINDOW WELL BOTTOM DRAINAGE AND SEALING VALVE
Filed Nov. 18, 1955
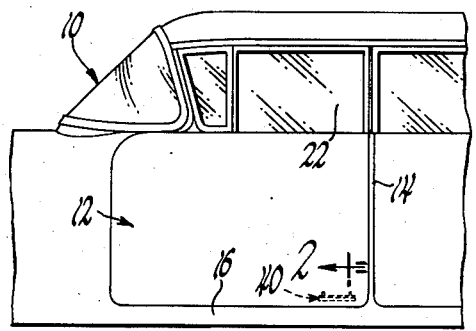
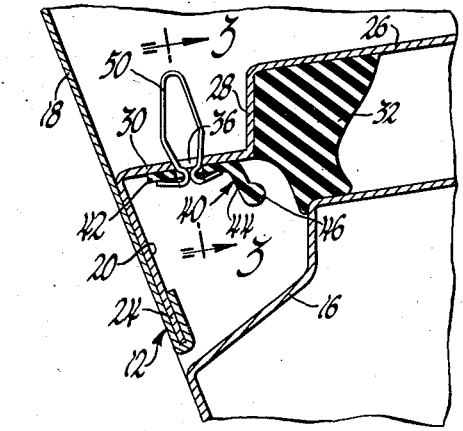
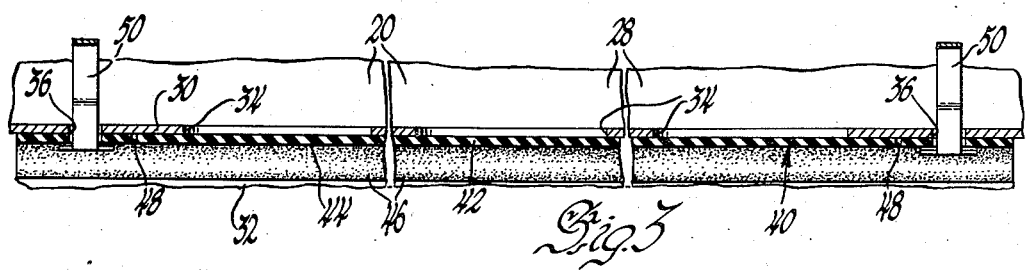
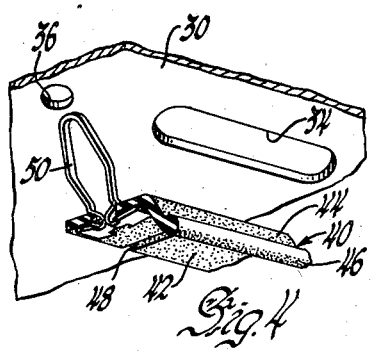
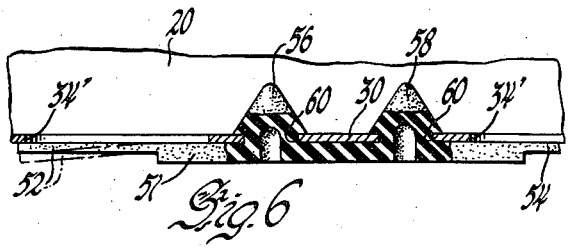
INVENTOR.
Robert L. Jones
BY
Paul Fitzpatrick
ATTORNEY

United States Patent Office 2,826,448
Patented Mar. 11, 1958

2,826,448

VEHICLE WINDOW WELL BOTTOM DRAINAGE AND SEALING VALVE

Robert L. Jones, St. Clair Shores, Mich., assignor to General Motors Corporation, Detroit, Mich., a corporation of Delaware Application November 18, 1955, Serial No. 547,810

6 Claims. (Cl. 296—44)

This invention relates to vehicle sealing means, and particularly to means for sealing the drain openings in the bottom of an automobile door.

An automobile door is formed of spaced outer and inner door panels which are joined by a generally horizontal portion adjacent their lower edge. This portion is provided with one or more drain holes to permit the escape of water which enters through the window opening at the top of the panels. Often in the past these drain openings have been left open, but this results in dust being drawn up into the door because of the partial vacuum inside the automobile when it is driven with the windows closed. The dust may clog the window regulator mechanism inside the door and the dust may be drawn into the interior of the body by the partial vacuum. Attempts have been made to close these drain openings by means of a flap valve having a flange which is cemented to the underside of the door inner panel adjacent the drain openings. Such sealing means have proved to be disadvantageous because often the cement would come loose and the flap valve would fall off, or the cement would often be carelessly applied so that the valve would not act as a flap valve but would permanently seal the drain openings so that water would accumulate inside the door.

I have devised and am herewith diclosing and claiming an improved flap valve which is secured to the automobile door by snap type fastening means so that the valve may be mounted on the door during assembly of the automobile by inexperienced personnel and proper flap valve operation will be obtained. The flap valve comprises an elongated flexible body having an integral flange projecting along one side thereof, and a thickened stiffening bead along the edge of the flange gives the valve body the desired degree of rigidity and proper hinge action. The body of the valve is formed with a transverse slot adjacent each end extending from the edge of the body to a location adjacent the flange and spring clip fasteners are mounted on the body outside the slots.

Other features and advantages of the invention will be apparent from the following description and from the drawing, in which:

Fig. 1 is a fragmentary side elevational view of an automobile having the improved flap valve in the front door;

Fig. 2 is an enlarged detail transverse section taken along the line 2—2 of Fig. 1;

Fig. 3 is a fragmentary longitudinal vertical section taken along the line 3—3 of Fig. 2;

Fig. 4 is a fragmentary isometric view showing the flap valve disassembled;

Fig. 5 is an isometric view of a modified form of flap valve; and

Fig. 6 is a fragmentary longitudinal section showing the flap valve of Fig. 5 mounted on an automobile door.

Referring now more particularly to the drawing, 10 represents an automobile having a front door 12 which is mounted on the body by hinges (not shown) at the front edge of the door. The door, when closed, seals at its rear edge against a center pillar 14 and at its bottom edge against a rocker panel 16 as shown in Figs. 2 and 3. The door is formed with a door outer panel 18 which has a generally vertical portion forming an exterior wall of the door and a generally parallel door inner panel 20 (Fig. 3) which is spaced from the outer panel to provide a compartment inside the door for the reception of the door window 22. The inner panel has at its bottom side a generally horizontal portion which joins the outer panel, being secured thereto by a pinch weld flange 24 at the lower edge of the outer panel 18. This horizontal portion includes a main bottom shelf 26 formed adjacent the outer panel with a downwardly bent flange 28 and an outwardly bent flange 30. As shown in Fig. 3, the flanges 28 and 30 form a longitudinally extending trough in the horizontal portion of the door inner panel adjacent the outer panel. A weather strip 32 is seated at the juncture of portions 26 and 28 and engages the rocker panel 16 when the door is closed to seal the door opening at the bottom. A plurality of drain openings 34 are in the outwardly extending flange 30 which forms the bottom of the drain trough. Preferably, there are three such openings arranged in a line as shown in Fig. 3. At each opposite end of these drain openings there is a small circular opening 36.

The flap valve, which is designated generally as 40, comprises an elongated flexible body 42 preferably formed of hard molded rubber and having an integral stiffening flange 44 projecting along the entire length of one side thereof. As shown in Figs. 2 and 4, the edge of the flange has a thickened stiffening bead 46 and the flange porjects from the body at an angle which preferably is slightly more than a right angle to provide optimum stiffness in the valve as a whole. Adjacent each end of the body there is a slot 48 which extends from the edge of the body to a location adjacent the flange 44. These slots separate the fastening portion of the valve body from the flap portion thereof. At each end of the body outside the respective slots 48 there is a metallic spring clip 50 extending through the rubber. These clips are inserted into the openings 36 to mount the flap valve on the exterior surface of the flange 30. The body portion of the valve covers the drain openings 34, and when the automobile is in motion with the windows closed, the valve body is held tightly against the undersurface of the flange 30 by the partial vacuum existing inside the car under these conditions. In the event moisture collects inside the door, it will run down inside the trough which is the lowest portion of the door and will seep through the drain openings past the valve.

In one embodiment which has been constructed, the valve has an overall length of the order of 4½ inches and each of the slots is located just slightly under ½ inch from the end of the valve body so that there is a distance of about 3.6 inches between slots where the drain openings can be located.

The snap type spring clips can be mounted on the valve body before assembly of the automobile, and the valve body can then be easily mounted on the underside of the door by unskilled personnel merely by inserting the spring clips into the openings 36 in the underside of the door. Even inexperienced personnel can mount the valve in such a manner that it permanently seals the drainage opening and will not fall off the door.

Figs. 5 and 6 show a modified form in which the flap valve comprises a flat elongated body having a relatively thick center portion 51 and relatively thin curved end portions 52 and 54. A pair of integral fastening studs 56 and 58 project from the center portion in the direction of the curvature of the end portion, these studs seating in openings 60 in the flange 30. Drain openings 34' are provided in locations where they may be closed by the opposite end portions 52 and 54 of the valve. The valve may be mounted as shown in Fig. 6, the studs 56 and 58 being snapped into openings in the flange 30.

While I have shown and described certain embodiments of my invention, it is capable of many modifications. Changes, therefore, in the construction and arrangement may be made without departing from the spirit and scope of the invention as set forth in the appended claims.

I claim:

1. A flap valve comprising an elongated flexible body; an integral flange projecting from the body along one side thereof and having an integral thickened stiffening bead along its edge, said body having a transverse slot adjacent each end extending from the other side of the body to a location adjacent said flange; and fastening means on each end of the body outside the adjacent slot.

2. A flap valve comprising an elongated flexible body; an integral flange projecting from the body along the entire length of one side thereof and having a thickened stiffening bead along its edge, said body having a transverse slot adjacent each end extending from the other side of the body to a location adjacent said flange and defining a flap portion of the body and a fastening portion at each end of the body; and a spring clip on each fastening portion of the body outside the adjacent slot.

3. A flap valve comprising an elongated rubber body of single thickness material; an integral flange projecting at an angle in excess of 90 degrees from the body along the entire length of one side thereof and having a thickened stiffening bead along its edge, said body having a transverse slot adjacent each end extending from the other side thereof to a location adjacent said flange and defining an imperforate flap portion of the body and a fastening portion at each end of the body; and a spring clip on each fastening portion of the body outside the adjacent slot.

4. Automobile door sealing apparatus of the character described, including: a door outer panel having a substantially vertical portion comprising an exterior wall of a door; a door inner panel having a substantially vertical portion spaced from said outer panel and a substantially horizontal portion joined with said outer panel adjacent the lower edge thereof, said horizontal portion having a longitudinally extending trough with at least one drain opening therethrough adjacent the outer panel; an elongated flexible flap valve on the exterior surface of the horizontal portion of said inner panel adjacent said opening, said valve being adapted to allow drainage from said opening but to prevent the entry of dust into said opening, said valve comprising an elongated flexible body having an integral flange projecting therefrom along one side thereof and said body having a transverse slot adjacent each end extending from the other side thereof to a location adjacent said flange and separating an imperforate flap portion of the body from a fastening portion at each end of the body; and fastening means securing each fastening portion of the body to the exterior surface of the horizontal portion of the inner panel.

5. Automobile door sealing apparatus of the character described, including: a door outer panel having a substantially vertical portion comprising an exterior wall of a door; a door inner panel having a substantially vertical portion spaced from said outer panel and a substantially horizontal portion joined with said outer panel adjacent the lower edge thereof, said horizontal portion having a longitudinally extending trough with at least one drain opening therethrough adjacent the outer panel; an elongated flexible flap valve on the exterior surface of the horizontal portion of said inner panel adjacent said opening, said valve being adapted to allow drainage from said opening but to prevent the entry of dust into said opening, said valve comprising an elongated flexible body and an integral flange projecting from the body along the entire length of one side thereof and having a thickened stiffening bead along its edge, said body having a transverse slot adjacent each end extending from the other side thereof to a location adjacent said flange and separating an imperforate flap portion of the body from a fastening portion at each end of the body; and fastening means securing each fastening portion of the body to the exterior portion of the horizontal portion of the inner panel.

6. Automobile door sealing apparatus of the character described, including: a door outer panel having a substantially vertical portion comprising an exterior wall of a door; a door inner panel having a substantially vertical portion spaced from said outer panel and a substantially horizontal portion joined with said outer panel adjacent the lower edge thereof, said horizontal portion having a longitudinally extending trough with at least one drain opening therethrough adjacent the outer panel; an elongated flexible flap valve on the exterior surface of the horizontal portion of said inner panel adjacent said opening, said valve being adapted to allow drainage from said opening but to prevent the entry of dust into said opening, said valve comprising an elongated rubber body having an integral flange projecting therefrom at an angle in excess of 90 degrees along the entire length of one side thereof, the flange having a thickened stiffening bead along its edge and said body having a transverse slot adjacent each end extending from the other side thereof to a location adjacent said flange and separating an imperforate flap portion of the body from a fastening portion at each end of the body; and snap type fastening means securing the fastening portions of said flap valve to the exterior surface of the horizontal portion of the inner panel.

References Cited in the file of this patent

UNITED STATES PATENTS

| | | |
|---|---|---|
| 1,451,033 | Todd | Apr. 10, 1923 |
| 2,187,331 | Schulz et al. | Jan. 16, 1940 |
| 2,263,806 | Hammerl | Nov. 25, 1941 |
| 2,680,916 | Smith | June 15, 1954 |
| 2,747,922 | Gibson | May 29, 1956 |

FOREIGN PATENTS

| | | |
|---|---|---|
| 738,391 | Germany | Aug. 13, 1943 |